United States Patent Office 3,337,245
Patented Aug. 22, 1967

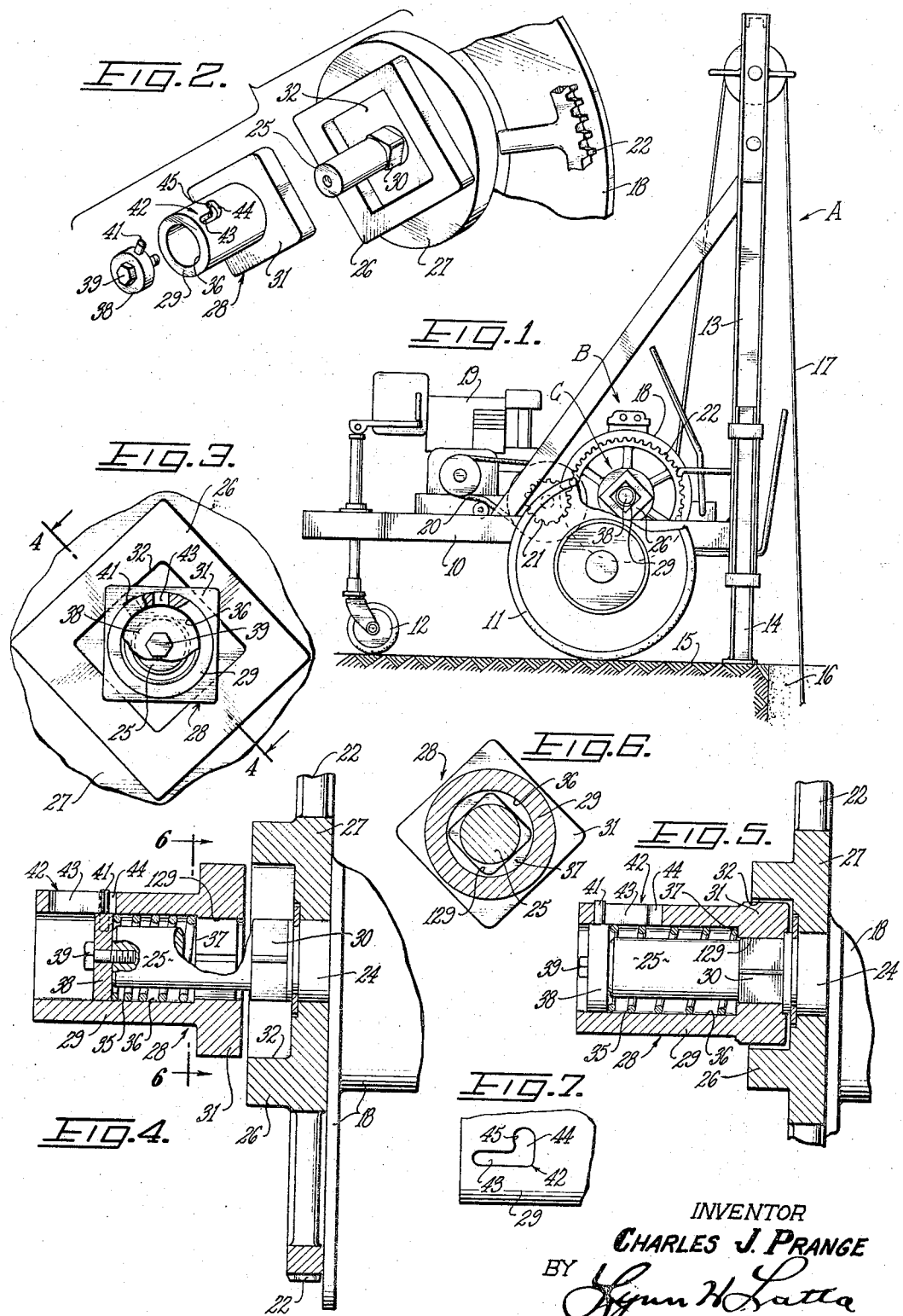

3,337,245
DOG CLUTCH FOR CABLE WINCHES
Charles J. Prange, Lima, Ohio, assignor to Flexible Sewertool Corporation, Lima, Ohio, a corporation of Ohio
Filed Jan. 8, 1965, Ser. No. 424,367
4 Claims. (Cl. 287—53)

ABSTRACT OF THE DISCLOSURE

Disclosed herein is a cable winch embodying an improved dog clutch for selectively clutching a winch drum to a drive shaft, adapted to be declutched by applying an axial pull to the hub of a shiftable clutch element thereof, having an improved bayonet lockout, and a loading spring for holding it in both clutching and lockout positions.

---

This invention relates to dog clutches suitable for use in heavy duty apparatus such as cable winches, and has as its object to provide a dog clutch which:

(1) Is relatively simple and inexpensive;
(2) Is especially rugged and durable and particularly useful when embodied in equipment such as cable winches in which it may be subjected to heavy shock loads;
(3) Is spring-loaded to engaged position and adapted to be disengaged by grasping and applying a pull to the hub of one of the clutch elements;
(4) Embodies an improved novel bayonet lockout between the hub and its shaft;
(5) Can be manually unlocked for engagement and is adapted to automatically engage without stopping rotation of its driving element;

Other objects and advantages will become apparent in the ensuing specification and appended drawing in which:

FIG. 1 is a side elevational view of a cable winch embodying my improved clutch;
FIG. 2 is an exploded, perspective view of the clutch parts;
FIG. 3 is an end view of the clutch shown in locked-out disengaged position;
FIG. 4 is an axial sectional view of the same;
FIG. 5 is an axial sectional view of the clutch in the engaged position;
FIG. 6 is a cross-sectional view taken on line 6—6 of FIG. 4; and
FIG. 7 is a diagram of the marginal configuration of the bayonet slot of the lockout means.

Referring now to the drawings in detail and in particular to FIG. 1, I have shown therein, as an example of one type of apparatus which the invention may be embodied, a cable winch machine A especially adapted for operation of a sewer-cleaning drag bucket (not shown) embodying a tricycle carriage comprising a horizontal chassis 10 supported on a pair of power driven travel wheels 11 and a steerable caster wheel 12; a derrick frame 13 at the end of chassis 10 adjacent wheels 11, vertically adjustable legs 14 at the lower end of derrick frame 13, adapted to be lowered into engagement with a pavement surface 15 adjacent a manhole 16 so as to brace the derrick 13 for vertical loads developed in drawing a drag bucket through a sewer, collecting debris therein and hoisting it out of the sewer on the end of a cable 17; and power driven winch apparatus B comprising a winch drum 18 (FIG. 4) for winding up and letting out the cable 17; a prime mover 19 (e.g. gasoline engine) mounted on the bed 10 and driving through a belt drive 20, spur pinion 21 and an annular rotary drive element (bull gear) 22 on the axis of the winch drum 18; and a dog clutch indicated generally at C, for establishing a driving connection between the bull wheel 22 and the winch drum 18.

The clutch assembly C (FIG. 4) comprises a projecting reduced end portion 25 of the shaft 24 on which drum 18 is mounted and to which it is secured; a female dog clutch element 26 secured to and projecting axially from the outer side of the hub portion 27 of annular drive element 22; a male clutch element 28 having a hub 29 mounted on the outer end of shaft 25; and a combined drive and lockout means connecting the hub 29 to the shaft 25 with a lost motion rotary drive connection and an axially shiftable connection which provides for shifting the male clutch element axially on the shaft 25 between the disengaged, locked-out position shown in FIGS. 3 and 4 and the engaged, driving position shown in FIGS. 1 and 5.

Shaft 24 projects through a central bore in bull gear hub 27, which provides, a journalled mounting of the annular rotary drive element 22 on the shaft. The back face of hub 27 has end-bearing engagement with a radial end face of winch drum 18. The female clutch element 26 is functionally integral with the hub 27 and accordingly is disclosed in the drawings as being integral although it should be understood that it can just as well be formed as a separate part and welded to the outer face of hub 27. The female clutch element 26 is preferably in the form of a ring of regular polyhedral form with its center coaxial with the shaft 24. For simplicity in design and fabrication combined with maximum drive efficiency, it is preferably of square configuration as shown. However, it may have more or less than four sides, or may comprise simply a pair of the side bars shown in FIG. 2 without the intervening connecting bars (e.g. may comprise a pair of parallel jaws of straight bar form) or may be of internally toothed construction such as internal ring gear.

The male clutch element 28 has a polyhedral central coupling aperture 129 adapted to establish a drive-transmitting coupling to a correspondingly polyhedral coupling shank 30 on shaft 24, at the base of reduced end portion 25. Male clutch element 28 comprises a clutch head 31 having a peripheral configuration conformed to that of the female clutch element 26 for mating coupling with a clutch socket 32 defined therein. Where the female clutch element 26 is square as shown, the clutch head 31 is likewise square, with dimensions slightly smaller than those of cavity 32 to provide sufficient clearance so that it may automatically move into the clutch socket 32 under spring-loading when it is in bearing engagement with the outer face of the female clutch element 26 and the latter is being rotated. Aperture 129 is formed as an annular inner portion of head 31. Such inner portion and coupling shank 30 are preferably of substantially equal axial extent, slightly less than the axial travel of male clutch element 28 in shifting between disengaged and engaged positions and vice versa. Coupling shank 30 is positioned to commence entry of aperture 129 simultaneously with or slightly after the beginning of entry of male clutch element 31 into clutch socket 32, so that the shock of initial clutch engagement is absorbed by clutch elements 26 and 31, and the coupling elements 29 and 30 are thereby protected from the wear and the chipping and other damage tending to occur from such engagement.

Spring-loading biasing of male clutch element 28 toward its engaged position is provided for by a coil spring 35 which is enclosed in a bore 36 extending through the hub 29 and terminating at a radial shoulder 37 defined by the annular inner portion of clutch head 31, which projects radially inwardly from the wall of bore 36. Coil spring 35 is engaged under compression between shoulder 37 and a disc 38 which is secured to the end of shaft 25 by suitable means such as a cap screw 39. Disc 38 is rotatably fitted within the outer end of hub 29. Reduced portion 25 of shaft 24 is fitted within polyhedral aperture 29, so that the flat faces of the aperture closely encircle the shaft portion 25 with bearing engagement thereon so as to cooperate with disc 35 to maintain coaxiality of the shaft and the male clutch element 28.

The lockout connection between the shaft 25 and hub 29 comprises a lockout pin 41 mounted in and extending radially from disc 38 and secured therein as by means of a press-fit in a radial bore therein. Pin 41 projects radially into a bayonet slot or recess 42 in the hub 29. Bayonet slot 42 (FIG. 2) comprises an axial leg 43 extending parallel to the clutch axis and a circumferential leg 44 just long enough to provide for lockout retention of the pin 41. As shown in FIG. 6, the circumferential leg 44 has on its side nearest the end of leg 43 a shoulder which defines an acute dihedral angle relative to the adjoining side of leg 43, thus providing a retainer pocket 45 projecting toward the end of leg 43, in which the pin 41 will have a spring-loaded bottoming action securely retaining it against accidental release into the leg 43 under the effect of vibration etc.

Spring 35 is adapted to effect automatic shift of the male clutch element 28 into its clutching position from the lockout position of FIG. 4 when male clutch head 31, in face-to-face bearing engagement with rotating female clutch element 26, becomes registered with the female clutch socket 32.

In operation, the clutch C when in the engaged position, transmits rotation from the annular rotary drive element 22 to the shaft 24 and thence to the winch drum 18. When it is desired to disengage the clutch, the rotation of annular drive element 22 is arrested, and the hub 29, functioning as a handle, is grasped in the operator's hand and pulled rearwardly until the end of lockout pin 41 is registered with the circumferential leg 44 of bayonet slot 42, when coupling shank 30 will be released from aperture 29. The hub 29 is then twisted clockwise (as viewed in FIG. 3) causing the pin 41 to enter the circumferential leg 44 of the bayonet slot and to seat in the retainer pocket 45 thereof. The spring loading will maintain the pin snugly in engagement with the retainer pocket 45, thus permitting declutched operation of the apparatus without risking the accidental escape of the male clutch element 28 from its lockout connection as the result of vibration.

When it is desired to engage the clutch, the operator again grasps the hub 29, applies a pull thereto to balance the compressive loading of spring 35 and then rotates the male clutch element 28 counterclockwise until the pin 41 is released into the axial leg 43. The operator than releases hub 29, whereupon the spring-loading will advance the male clutch head 31 into face-to-face bearing engagement with female clutch element 26. This can be done while the annular drive element 22 is rotating, and the male clutch head 31 will ride against the outer face of female clutch element 26 until the female clutch socket 32 moves into registration with the periphery of male clutch head 31, when coupling shank 30 will correspondingly be registered with coupling aperture 129, and the clutch head 31 will drop into the clutch socket 32 while coupling shank 30 enters the aperture 29, and the parts will then move to the engaged position of FIG. 5.

I claim:
1. In a dog clutch assembly for intermittently transmitting drive from a rotary drive element driven by a prime mover: a hub constituting a part of said rotary drive element, a driven shaft extending through said hub and connected to transmit drive to a working member; a female clutch element secured to said hub, projecting axially therefrom and defining therewith a non-circular clutch socket; a male clutch element including a clutch head and a hub extending away from said rotary drive element and mounted on said shaft, said head being of mating configuration for clutching engagement in said socket, said male clutch element having an axial counterbore extending through its hub and an annular radially inwardly projecting internal lip defining an end of said counterbore within said head, said lip having a non-circular inner margin defining a coupling aperture, said shaft having a coupling portion of correspondingly non-circular cross-section slidably receivable in said aperture to provide a drive coupling connection between said head and said shaft; a coil spring disposed in said counterbore and having one end seated against said lip; an abutment disc secured to the outer end of said shaft within said counterbore and engaging the other end of said spring under compression; a locking pin projecting radially outwardly from a radial bore in said abutment disc; said hub having a bayonet slot in which the end of said pin is received, said slot including an axial leg providing for axial shift of said male clutch element between engaged and disengaged positions and a circumferential leg extending toward said clutch head in a position to receive said pin upon movement of the male clutch element away from said rotary drive element to a disengaged position, followed by rotary shift thereof, thereby to establish a lockout holding connection between the male clutch element and the shaft, said clutch elements having flat, smooth radial faces which are in adjacent, opposed relation in the clutch-disengaged position and are adapted for spring-loaded yielding bearing engagement with one another upon release of said holding connection, such release providing for relative rotary adjustment of said clutch elements from non-registering to registering positions determined by reception of said pin in said axial leg of said slot, followed by automatic spring-driven coupling engagement of said clutch elements.

2. A clutch assembly as defined in claim 1, wherein said circumferential leg of each bayonet slot has a retainer pocket projecting toward the end of the hub, to retain a respective end of said pin against accidental dislodgement therefrom under the effect or vibration.

3. A clutch assembly as defined in claim 1, wherein said female clutch element consists of a ring secured to said rotary drive element, its socket being polyhedral; said male clutch head having a correspondingly polyhedral periphery of slightly smaller area than said socket so as to readily enter the same.

4. A clutch assembly as defined in claim 1, wherein said shaft coupling portion is positioned substantially in the plane of said female clutch element, and wherein said male clutch head and internal lip are in a common plane and of substantially equal thickness, whereby it will be coupled to and uncoupled from said coupling aperture substantially simultaneously with the clutching and unclutching of said clutch elements.

References Cited

UNITED STATES PATENTS

| | | | |
|---|---|---|---|
| 105,597 | 7/1870 | Rank | 192—67 |
| 136,270 | 2/1873 | Rushworth | 192—67 |
| 256,842 | 4/1882 | Lehmann | 287—53 X |
| 1,064,889 | 6/1913 | Deves | 192—108 X |
| 2,635,727 | 4/1953 | Bitler | 192—67 |
| 3,157,258 | 11/1964 | Cronholm | 192—67 X |
| 3,251,630 | 5/1966 | Astley | 287—53 X |

FOREIGN PATENTS 427,193    11/1947    Italy.

CARL W. TOMLIN, *Primary Examiner.*

A. V. KUNDRAT, *Assistant Examiner.*